(12) United States Patent
Wouhaybi et al.

(10) Patent No.: US 9,377,818 B2
(45) Date of Patent: Jun. 28, 2016

(54) DETACHABLE DISPLAYS

(71) Applicant: Intel Corporation, Santa Clara, CA (US)

(72) Inventors: Rita H. Wouhaybi, Portland, OR (US); Hong W. Wong, Portland, OR (US); David W. Browning, Beaverton, OR (US); James M. Okuley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/367,985

(22) PCT Filed: Dec. 20, 2013

(86) PCT No.: PCT/US2013/077108
§ 371 (c)(1),
(2) Date: Jun. 23, 2014

(87) PCT Pub. No.: WO2015/094357
PCT Pub. Date: Jun. 25, 2015

(65) Prior Publication Data
US 2015/0212550 A1 Jul. 30, 2015

(51) Int. Cl.
*G06F 1/16* (2006.01)
*G06F 3/14* (2006.01)
*G09G 5/12* (2006.01)
*G06F 3/147* (2006.01)
*G09G 5/00* (2006.01)

(52) U.S. Cl.
CPC ............... *G06F 1/1654* (2013.01); *G06F 1/16* (2013.01); *G06F 1/1647* (2013.01); *G06F 3/14* (2013.01); *G06F 3/147* (2013.01); *G06F 3/1423* (2013.01); *G09G 5/006* (2013.01); *G09G 5/12* (2013.01); *G09G 2300/023* (2013.01); *G09G 2356/00* (2013.01); *G09G 2370/20* (2013.01); *G09G 2370/22* (2013.01); *G09G 2380/02* (2013.01); *G09G 2380/06* (2013.01)

(58) Field of Classification Search
CPC ... G05F 1/1423; G05F 1/1647; G05F 1/1654; G09G 5/12; G09G 2300/026; G06F 1/1647; G06F 1/1654; G06F 3/1423–3/1446
USPC ..................................................... 345/1.1, 1.3
See application file for complete search history.

(56) References Cited

U.S. PATENT DOCUMENTS

| | | |
|---|---|---|
| 2007/0174918 A1 | 7/2007 | Hirose et al. |
| 2009/0141439 A1 | 6/2009 | Moser |
| 2010/0265646 A1* | 10/2010 | Lee .................. G06F 1/1616 361/679.09 |
| 2011/0199726 A1* | 8/2011 | Moser ................ G06F 1/1654 361/679.09 |
| 2013/0328399 A1* | 12/2013 | Suzuki ............... G06F 1/1654 307/29 |

OTHER PUBLICATIONS

International Search Report and Written Opinion for Application No. PCT/US2013/077108, dated Aug. 29, 2014, 10 pages.

* cited by examiner

*Primary Examiner* — Larry Sternbane
(74) *Attorney, Agent, or Firm* — Barnes & Thornburg LLP (57) ABSTRACT

Technologies for utilizing a plurality of displays include a computing device and a plurality of detachable display units physically coupled to the computing device. The computing device executes an application of the computing device and assigns the application to a detachable display unit of the plurality of detachable display units. The detachable display unit monitors for detachment of the detachable display unit from the computing device and maintains execution of the assigned application in response to detachment of the detachable display unit.

21 Claims, 7 Drawing Sheets

DETACHABLE DISPLAYS

CROSS REFERENCE TO RELATED APPLICATIONS

This application is a national stage entry under 35 USC §371(b) of International Application No. PCT/US2013/077108, which was filed Dec. 20, 2013.

BACKGROUND

On any given day, a typical person may use a smartphone, tablet computer, office desktop computer, and other computing devices. As computing devices continue to be further integrated into individuals' busy everyday lives, their workflows will continue to become more nonlinear. That is, a person may begin work on a project without finishing a project already started or perform multiple computational tasks in parallel (e.g., on a single computing device). For example, a person may begin to check her email upon arriving to work, execute a script to generate some data, begin working on a written proposal, and later return to checking email and reviewing the results of the executed script.

If a single computing device is used to perform a large number of tasks (e.g., execute several applications), many of the tasks must typically be minimized to prevent the user's screen from becoming "crowded" and essentially unusable. Numerous measures have been taken in an attempt to remedy this problem. For example, users oftentimes connect their computing devices to external monitors to obtain more screen space, but such monitors tend to be bulky and inconvenient for mobile or temporary use. Alternatively, virtual desktops may be defined that allow users to define "screens" and have them attached to actions or events that allow them to be moved out of the way and brought back (e.g., via a simple gesture). However, such virtual desktops are nonetheless limited to the "real estate" defined by the size of the user's physical screen.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
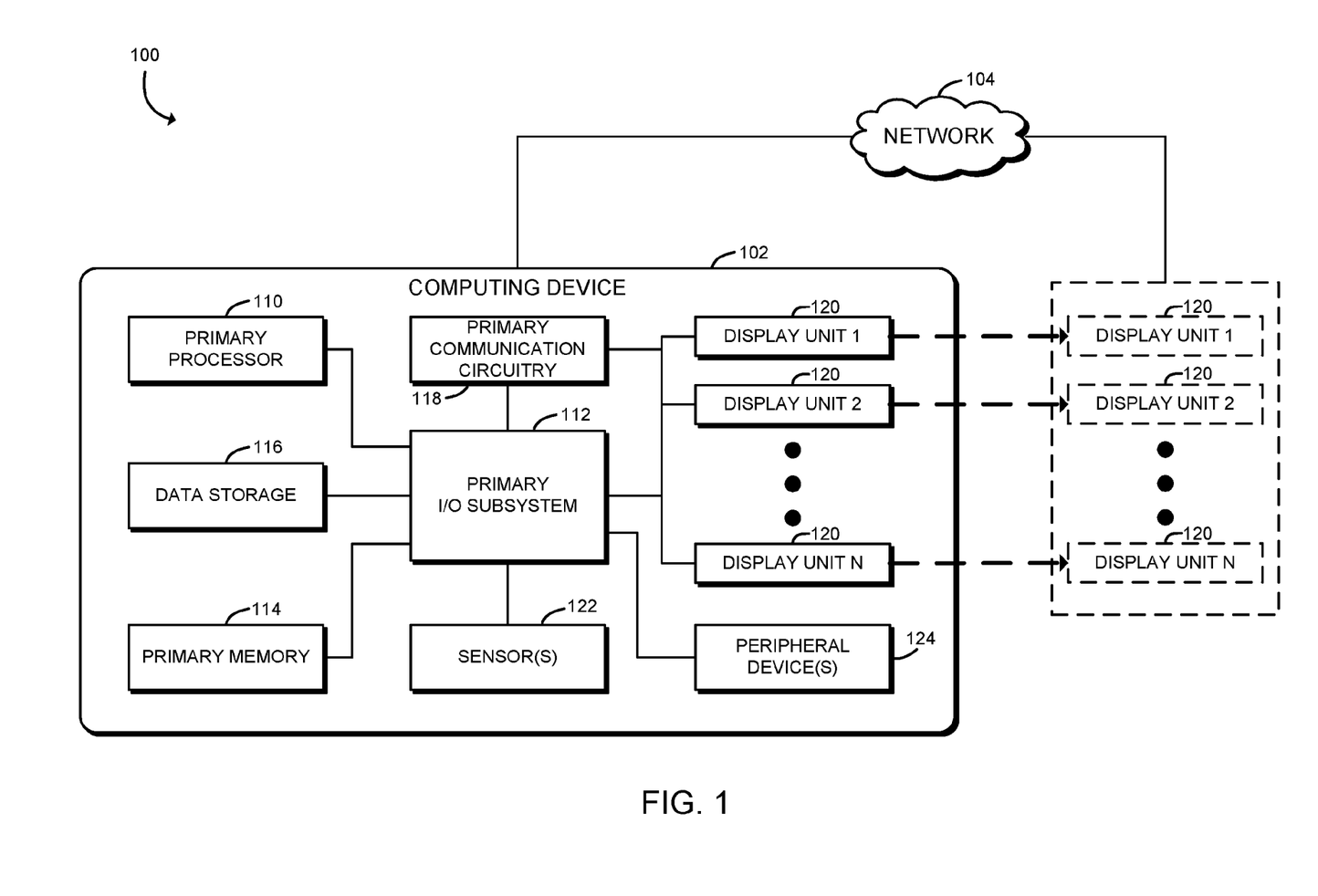
FIG. 1 is a simplified block diagram of at least one embodiment of a system for utilizing a plurality of displays.

Referring now to FIG. 1, a system 100 for utilizing a plurality of displays includes a computing device 102, a network 104, and a plurality of display units 120, which may be detachably attached to the computing device 102 in some embodiments. In use, as described in more detail below, the computing device 102 assigns an application to one of the display units 120 for execution. The display unit 120 monitors for detachment of the display unit 120 from the computing device 102 and, if detached, maintains execution of the assigned application on the display unit 120. In other words, a user of the computing device 102 can assign an application for execution on one of the display units 120 and subsequently detach the display unit 120, and the application will continue to execute (e.g., uninterrupted) on the detached display unit 120. The detached display unit 120 may be moved around, placed in a desired location (e.g., attached to a wall), and/or subsequently reattached to the computing device 102 if so desired. As discussed in more detail below, each display unit 120 has suitable circuitry and supporting software/firmware to execute the assigned application and interact with the computing device 102, unlike a typical "dumb" display.

The computing device 102 may be embodied as any type of computing device capable of utilizing a plurality of displays and performing the functions described herein. For example, the computing device 102 may be embodied as a desktop computer, laptop computer, netbook, notebook, Ultrabook™, tablet computer, cellular phone, smartphone, personal digital assistant, mobile Internet device, Hybrid device, and/or any other computing/communication device. As shown in FIG. 1, the illustrative computing device 102 includes a primary processor 110, a primary input/output ("I/O") subsystem 112, a primary memory 114, a data storage 116, a primary communication circuitry 118, a plurality of display units 120, one or more sensors 122, and one or more peripheral devices 124. Of course, the computing device 102 may include other or additional components, such as those commonly found in a typical computing device (e.g., various input/output devices), in other embodiments. Additionally, in some embodiments, one or more of the illustrative components may be incorporated in, or otherwise form a portion of, another component. For example, the primary memory 114, or portions thereof, may be incorporated in the primary processor 110 in some embodiments. In the illustrative embodiment, the processor 110, the I/O subsystem 112, the memory 114, and the communication circuitry 118 are described as "primary" components to signify that those components are distinct from the corresponding "secondary" components of each of the display units 120 discussed below. In some embodiments, the "primary" components of the computing device 102 are more extensive, have greater performance, and/or result in great power consumption than the corresponding "secondary" components of the display units 120.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The communication circuitry 118 may be embodied as any communication circuit, device, or collection thereof, capable of enabling communications between the computing device 102 and other remote devices (e.g., detached display units 120) over the network 104. To do so, the communication circuitry 118 may use any suitable communication technology (e.g., wireless or wired communications) and associated protocol (e.g., Ethernet, Bluetooth®, Wi-Fi®, WiMAX, etc.) to effect such communication depending on, for example, the type of network, which may be embodied as any type of communication network capable of facilitating communication between the computing device 102 and remote devices.

The display units 120 may be embodied as any type of display device physically detachable from (and attachable to) the computing device 102 and capable of rendering content on a display and performing the functions described herein. In some embodiments, each of the display units 120 is embodied as a thin transparent layer that may be "peeled" from the computing device 102 and stuck to another surface (e.g., a horizontal or vertical surface). For example, the plurality of display units 120 may be embodied as a stack of display units 120 similar to a pad of transparent "sticky" notes. Additionally, as discussed in detail below, once removed (i.e., detached) from the computing device 102, a display unit 120 can still wirelessly communicate with the computing device 102 (e.g., to access resources of the computing device 102). Additionally, each display unit 120 may have independent output modalities (e.g., audio, vibration, and/or other sensory outputs) and/or sensors/inputs.

Figure 2:
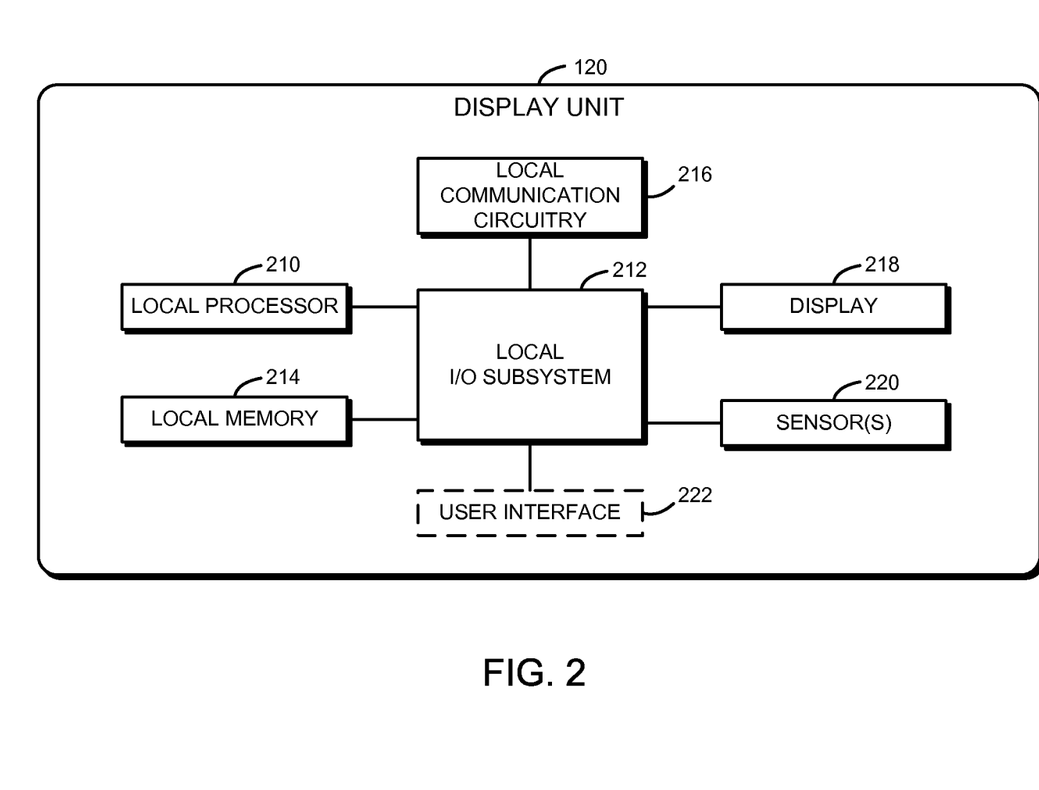
FIG. 2 is a simplified block diagram of at least one embodiment of a display unit of the system of FIG. 1.

An illustrative embodiment of a display unit 120 of the computing device 102 is shown in FIG. 2. The illustrative display unit 120 includes a local processor 210, a local I/O subsystem 212, a local memory 214, a local communication circuitry 216, a display 218, and one or more sensors 220. The display unit 120 may also include a user interface 222. Of course, the display unit 120 may include other or additional components, such as those commonly found in independent display units or computer devices, in other embodiments (e.g., input/output components and/or peripheral devices). Additionally, in some embodiments, one or more of the illustrative components may be incorporated in, or otherwise form a portion of, another component. For example, the user interface 222, or portions thereof, may be incorporated in the display 218 in some embodiments (e.g., as a touchscreen). The description of the primary processor 110, the primary I/O subsystem 112, the primary memory 114, and the primary communication circuitry 118 of the computing device 102 is equally applicable to the description of the local processor 210, the local I/O subsystem 212, the local memory 214, and the local communication circuitry 216 and is not repeated herein for clarity of the description.

The display 218 may be embodied as, or otherwise use, any suitable display technology capable of performing the functions described herein. For example, the display 218 may be embodied as a liquid crystal display (LCD), a light emitting diode (LED) display, a cathode ray tube (CRT) display, a plasma display, an image projector, and/or other display technology. In some embodiments, the display 218 is embodied as a thin, transparent LCD. Additionally, depending on the particular embodiment, the display units 120 may have displays 218 of the same size or of different sizes.

The sensors 220 are configured to collect data that may be used by the display unit 120 and/or the computing device 102 to determine the context of the display unit 120. For example, the sensors 220 may generate data based on the environment and/or operation of the display unit 120. As such, the sensors 220 may include, for example, proximity sensors, optical sensors, light sensors, audio sensors, temperature sensors, thermistors, motion sensors, piezoelectric sensors, and/or other types of sensors capable of generating data useful in determining the context of the display unit 120. Of course, the display unit 120 may also include components and/or devices configured to facilitate the use of the sensors 220. As discussed in detail below, data generated by the sensors 220 may be used by the display unit 120 and/or the computing device 102 to determine whether a condition has been satisfied (e.g., an expiry condition) with regard to an application executing remotely on the display unit 120 or with regard to the display unit 120 itself.

The user interface 222 permits a user to interact with the display unit 120. For example, the user may interact with an application assigned to the display unit 120 by the computing device 102. As such, in some embodiments, the user interface 222 may include one or more virtual and/or physical buttons, knobs, switches, keypads, touchscreens (e.g., the display 218), and/or other mechanisms to permit I/O functionality. It should be appreciated that, in some embodiments, the components of the display unit 120 other than the display 218 are positioned such that they generally do not detract from a user's view of the display 218. For example, the local processor 210, the I/O subsystem 212, the local memory 214, the local communication circuitry 216, the sensors 220, and/or the user interface 222 may be positioned at the periphery of the display unit 120, integrated (e.g., transparently) into the fabric of the display, and/or otherwise deemphasized.

Returning to FIG. 1, in the illustrative embodiment, the computing device 102 also includes one or more sensors 122 capable of generating data from which the context of the computing device 102 and/or the display unit(s) 120 may be determined. It should be appreciated that the sensors 122 of the computing device 102 may be similar to the sensors 220 of the display unit 120. Accordingly, the description of the sensors 220 is equally applicable to the sensors 122 and is not repeated herein for clarity of the description. The peripheral devices 124 of the computing device 102 may include any number of additional peripheral or interface devices. The particular devices included in the peripheral devices 124 may depend on, for example, the type and/or intended use of the computing device 102.

As discussed above, a detached display unit 120 may communicate with the computing device 102 over the network 104. The network 104 may be embodied as any type of communication network capable of facilitating such communication between the computing device 102 and remote devices (e.g., display units 120 that have been detached from the computing device 102). As such, the network 104 may include one or more networks, routers, switches, computers, and/or other intervening devices. For example, the network 104 may be embodied as or otherwise include one or more local or wide area networks, publicly available global networks (e.g., the Internet), cellular networks, telephone networks, ad hoc networks, or any combination thereof.

Figure 3:
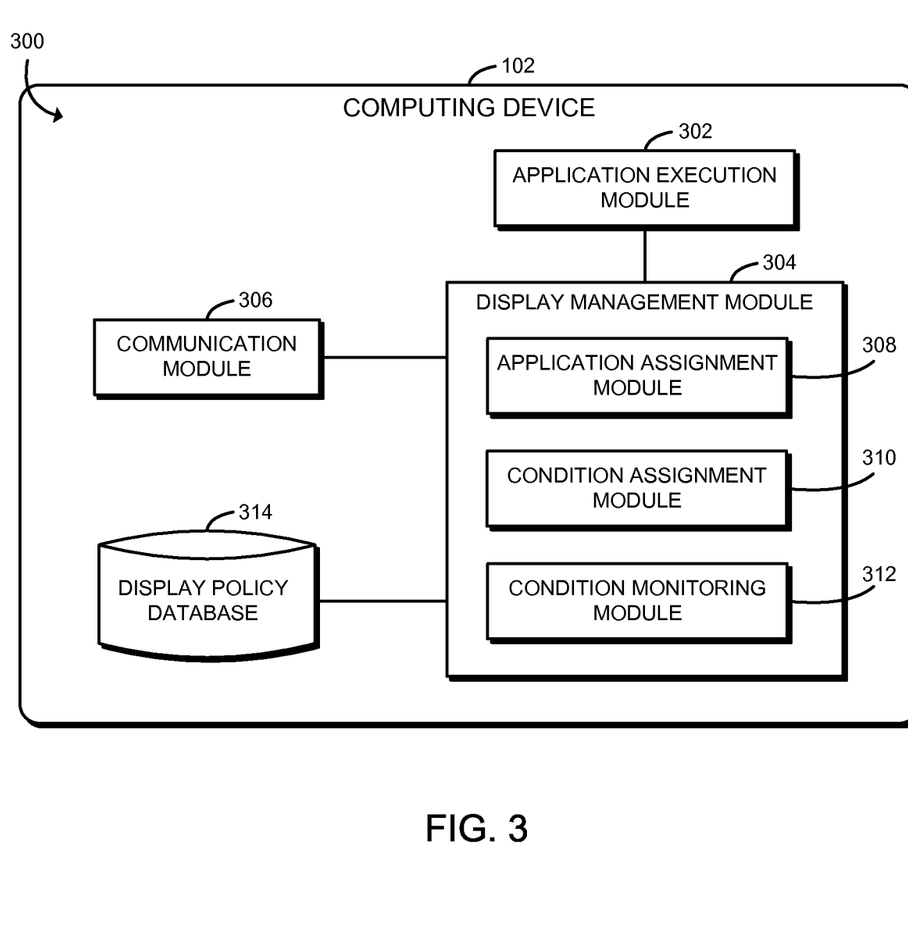
FIG. 3 is a simplified block diagram of at least one embodiment of an environment of a computing device of the system of FIG. 1.

Referring now to FIG. 3, in use, the computing device 102 of the system 100 establishes an environment 300 for utilizing a plurality of detachable display units 120. As discussed below, the computing device 102 is configured to execute applications and select display units 120 to which to assign applications for execution. Upon detachment from the computing device 102, the display unit 120 is able to initiate and/or maintain execution of the application (e.g., based on an assigned context). In some embodiments, the computing device 102 may also monitor data of the display unit 120 to determine whether pre-established conditions have been satisfied (e.g., expiry conditions). The illustrative environment 300 of the computing device 102 includes an application execution module 302, a display management module 304, and a communication module 306. Additionally, the display management module 304 includes an application assignment module 308, a condition assignment module 310, and a condition monitoring module 312. Each of the application execution module 302, the display management module 304, the communication module 306, the application assignment module 308, the condition assignment module 310, and the condition monitoring module 312 may be embodied as hardware, software, firmware, or a combination thereof. Additionally, in some embodiments, one of the illustrative modules may form a portion of another module (e.g., the display management module 304 may form a portion of the application execution module 302).

The application execution module 302 is configured to execute one or more applications of the computing device 102. For example, the application execution module 302 may execute applications selected by a user of the computing device 102 to launch. The applications executed by the application execution module 302 may include, for example, software applications, program code, binary instructions, and/or other executable instructions. In some embodiments, the application execution module 302 may execute an application assigned to a display unit 120 until the display unit 120 has been detached from the computing device 102. For example, the application execution module 302 may execute the application on the computing device 102 in a virtual machine that migrates to the display unit 120 (e.g., when detached). Additionally, in some embodiments, the application execution module 302 may initialize, or otherwise prepare, an application for execution by the selected display unit 120 without initiating the execution of the application on the computing device 102 itself.

The display management module 304 manages the assignment of applications to the display units 120 and any conditions corresponding with the assigned applications and/or display units 120. Additionally, in the illustrative embodiment, the display management module 304 updates and maintains a display policy database 314 stored on the computing device 102. As discussed below, the display policy database 314 may store information regarding the assigned applications, conditions, corresponding condition actions, context information, and/or other parameters. For example, the display policy database 314 may store context parameters for a particular assigned application such as privacy, security, access rights, authentication, ownership, location, and other information. The display policy database 314 may be embodied as any suitable data structure for storing such information (e.g., a database).

The application assignment module 308 assigns an application to one or more of the display units 120. For example, the user of the computing device 102 may select an application to assign to a display unit 120 and, in some embodiments, may select the particular display unit 120 to which the application is to be assigned. In other embodiments, the application assignment module 308 may assign an application to a display unit 120 without a user selection (e.g., automatically). For example, in an embodiment in which the display units 120 are layered or stacked on the computing device 102 (i.e., similar to a "sticky" pad), the application assignment module 308 may assign an application to the display unit 120 at the top of the stack. It should be appreciated that any suitable techniques or mechanisms for assigning applications may be employed. For example, in some embodiments, the user may manage application assignments using a graphical user interface on a display of the computing device 102. Additionally, in some embodiments, the application assignment module 308 may assign a context (e.g., a current context of the application on the computing device 102) of an application to the display unit 120 when the application is assigned to that display unit 120.

The condition assignment module 310 manages the assignment of conditions to assigned applications and/or the display units 120. As discussed in detail below, the condition assignment module 310 may establish a condition of an application assigned to a display unit 120 and a corresponding action to occur in response to satisfaction of the condition (e.g., based on input of a user of the computing device 102). For example, the user may desire an application to be accessible only for a certain period of time. In such an embodiment, the assigned condition may be expiration of a predefined period of time and the corresponding action may be to terminate (i.e., close) the application after that period of time has expired. As such, as discussed below, it should be appreciated that the computing device 102 may transmit an instruction to a detached display unit 120 to perform some action in response to determining that a condition has been satisfied. Additionally, in some embodiments, the condition assignment module 310 permits a user of the computing device 102 to modify or update conditions and corresponding actions for an assigned application (e.g., by modifying corresponding data of the display policy database 314).

The condition monitoring module 312 monitors data of the display units 120 (e.g., the display units 120 that have been detached) to determine whether any established conditions have been satisfied (e.g., based on conditions stored on the display policy database 314). In some embodiments, a display unit 120 transmits sensor data generated by the sensors 220, which is evaluated by the condition monitoring module 312 of the computing device 102 to determine whether any of the conditions for any of the applications execution on the display unit 120 have been satisfied. However, as discussed in more detail below and depending on the particular embodiment, the computing device 102 and/or the display unit 120 may handle the monitoring of the conditions related to the display unit 120. Accordingly, in some embodiments, the condition monitoring module 312 does not monitor data of detached display units 120 (i.e., only the corresponding display unit 120 does). The condition monitoring module 312 may also perform the stored action corresponding to the condition is response to the condition being satisfied.

The communication module 306 handles the communication between the computing device 102 and remote devices (e.g., detached display units 120) through the network 104. It should be appreciated that, in some embodiments, the computing device 102 and a display unit 120 of the computing device 102 may communicate via the primary I/O subsystem 112 while the display unit 120 is physically coupled to the computing device 102 and communicate via the communication circuitry 118, 216 while the display unit 120 is detached from the computing device 102. In other embodiments, the computing device 102 and display units 120 always communicate via the communication circuitry 118, 216.

Figure 4:
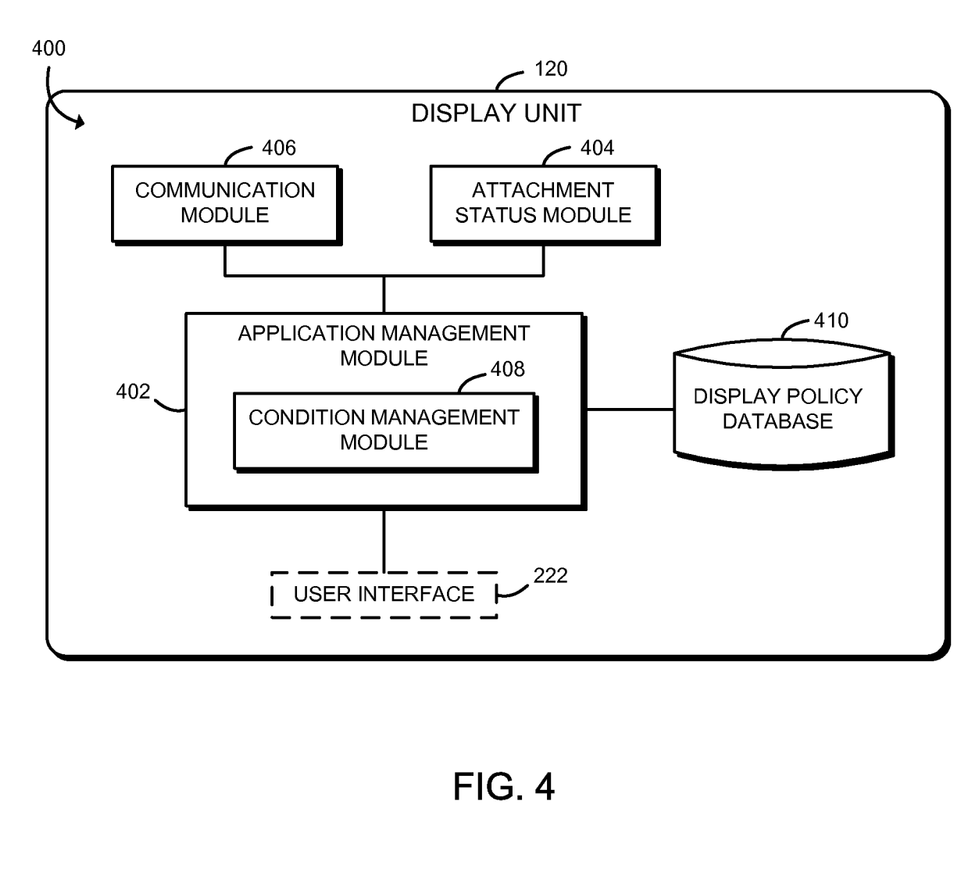
FIG. 4 is a simplified block diagram of at least one embodiment of an environment of the display unit of FIG. 2.

Referring now to FIG. 4, in use, a display unit 120 of the plurality of display units 120 of the system 100 establishes an environment 400 for execution of an application of the computing device 102. As discussed below, an application may be assigned to the display unit 120 by the computing device 102 for execution. The display unit 120 monitors for its detachment from the computing device 102 and maintains execution of the assigned application upon detachment from the computing device 102 (e.g., based on an assigned context). The illustrative environment 400 of the display unit 120 includes an application management module 402, an attachment status module 404, and a communication module 406. Additionally, the application management module 402 includes a condition management module 408. Each of the application management module 402, the attachment status module 404, the communication module 406, and the condition management module 408 may be embodied as hardware, software, firmware, or a combination thereof. Additionally, in some embodiments, one of the illustrative modules may form a portion of another module (e.g., the attachment status module 404 may form a portion of the application management module 402).

The application management module 402 receives application assignments from the computing device 102 with respect to the display unit 120. That is, when an application is assigned by the computing device 102 (e.g., in response to user input) to the display unit 120, the application management module 402 handles such application assignment. As discussed above, when an application is assigned to the display unit 120, the computing device 102 may transmit a context of the application to the display unit 120 (e.g., the execution context). Additionally, the application management module 402 may also receive from the computing device 102 one or more conditions of the application and corresponding actions to occur in response to satisfaction of the conditions. In the illustrative embodiment, the application management module 402 also maintains, or initiates (if required), execution of the assigned application (e.g., based on the assigned context) if the display unit 120 is detached from the computing device 102. Further, the application management module 402 may perform a reattachment action if the display unit 120 is reattached to the computing device 102. For example, the application management module 402 may update the computing device 102 with the context of the application upon reattachment to the computing device 102 (e.g., so the computing device 102 may maintain execution of the application).

The attachment status module 404 monitors the attachment status of the display unit 120 with the computing device 102. That is, the attachment status module 404 monitors for detachment of the display unit 120 from the computing device 102 when the display unit 120 is physically coupled to the computing device 102. Additionally, the attachment status module 404 monitors for reattachment of the display unit 120 to the computing device 102 when the display unit 120 is detached from the computing device 102. In some embodiments, the attachment status module 404 transmits a status message to the application management module 402 of the display unit 120 in response to detecting detachment and/or reattachment of the display unit 120. It should also be appreciated that, in some embodiments, the computing device 102 transmits the context of the assigned application to the corresponding display unit 120 at the time of detachment of the display unit 120 from the computing device 102 (i.e., rather than at the time of assignment).

The condition management module 408 handles conditions and corresponding actions of applications assigned to the display unit 120. As discussed above, depending on the particular embodiment, the computing device 102 and/or the display unit 120 may handle the monitoring of the conditions related to the display unit 120. As such, in embodiments in which the display unit 120 monitors the conditions, the display unit 120 may receive from the computing device 102 a condition of an application assigned to a display unit 120 and a corresponding action to occur in response to satisfaction of the condition. Additionally or alternatively, in some embodiments, a user may assign or modify conditions and/or corresponding actions of an application assigned to the display unit 120 via the user interface 222 (e.g., directly via a touchscreen portion of the display 218). The condition management module 408 may monitor sensor data generated by the sensors 122 of the display unit 120 to determine whether a condition has been satisfied and perform the corresponding action if the condition is satisfied.

In embodiments in which the computing device 102 monitors the conditions, the condition management module 408 may receive from the computing device 102 one or more instructions indicating actions to be performed by the display unit 120 (e.g., in response to a determination by the computing device 102 that a condition of the application has been satisfied) and may perform the indicated actions. The context, conditions, corresponding actions, and/or other parameters of assigned applications and/or the display unit 120 may be stored on the display policy database 410. It should be appreciated that the display policy database 410 of the display unit 120 may be similar to the display policy database 314 of the computing device 102. Additionally, in some embodiments, only one of the display policy databases 314, 410 may be utilized.

The communication module 406 of the display unit 120 may be similar to the communication module 306 of the computing device 102. Accordingly, the communication module 406 handles the communication between the display unit 120 and remote devices (e.g., the computing device 102) through the network 104.

Figure 5:
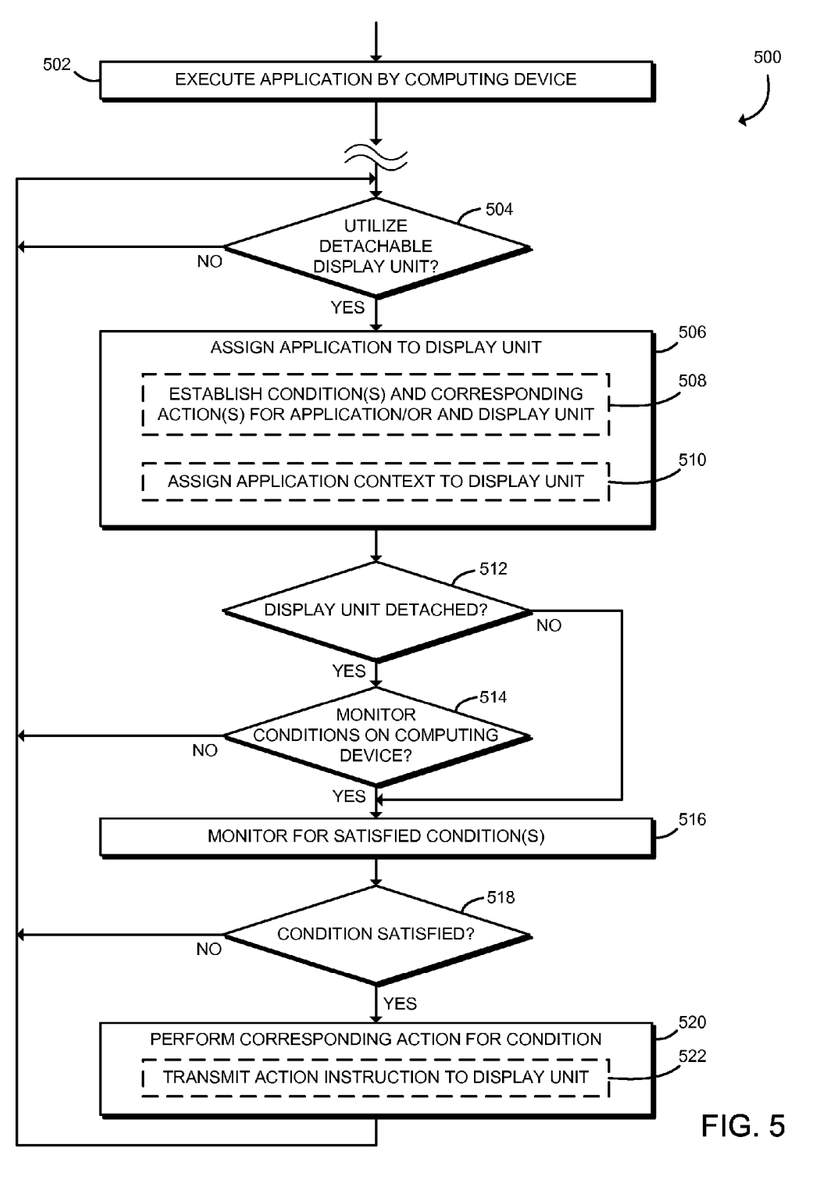
FIG. 5 is a simplified flow diagram of at least one embodiment of a method for utilizing a plurality of displays with the computing device of the system of FIG. 1.

Referring now to FIG. 5, in use, the computing device 102 of the system 100 may execute a method 500 for utilizing a plurality of display units 120. The illustrative method 500 begins with block 502 of FIG. 5 in which the computing device 102 executes an application. For example, a user of the computing device 102 may select an application for execution that the user desires to run (e.g., on the computing device 102 or on a detachable display unit 120). Alternatively, in some embodiments, the computing device 102 may initialize a selected application for execution by a display unit 120 (i.e., the application may or may not be executed by the computing device 102 itself). Regardless, in block 504, the computing device 102 determines whether to utilize a detachable display unit 120. As indicated in FIG. 5 by the "double tilde" symbol, the computing device 102 may make such a determination after some duration. It should be appreciated that the computing device 102 may determine whether to utilize a detachable display unit 120 before, after, or contemporaneously with the execution of the application.

If the computing device 102 determines to utilize a detachable display unit 120, the computing device 102 assigns the application to a display unit 120 in block 506. As discussed above, in some embodiments, the user of the computing device 102 may select a particular display unit 120 of the plurality of display units 120 of the computing device 102 to which the user wants to assign the application. For example, in an embodiment in which the display units 120 have different features or characteristics (e.g., different sensors, display sizes, etc.), the user may have a preference for a particular display unit 120. It should be appreciated that, in some embodiments, more than one application may be assigned to a particular display unit 120. In assigning the application to the display unit 120, the computing device 102 may establish one or more conditions and corresponding action for the application and/or the display unit 120 in block 508. For example, the user may assign one or more time- or event-based expiry conditions and corresponding actions (e.g., a notification mechanism). As discussed above, the conditions may be evaluated based on the context of the display unit 120 and/or sensor data generated from the sensors 122 of the display unit 120.

As one illustrative example, an audio application may be assigned to the display unit 120 including an expiry condition based on when the user takes off his or her headphones. That is, the display unit 120 may detect (e.g., via the sensors 122) that the user has removed his or her headphones and, for example, pause the audio (i.e., the corresponding action). In another illustrative example, the user may assign a web-based auction application to the display unit 120 including an expiry condition that is time-based and a corresponding action that involves beeping, vibrating, and/or forwarding the application back to a main screen/display of the computing device 102. As such, the user may monitor an auction to make a last minute bid without cluttering the user's primary working screen. Of course, in some embodiments, the application assigned to the display unit 120 may be assigned without any conditions and, therefore, may execute as it would on the computing device 102. For example, a slideshow application that is used to display family pictures might not be assigned a condition and corresponding action.

In block 510, the computing device 102 may assign the application context to the selected display unit 120. In other words, the computing device 102 may provide data or information to the display unit 120 that is indicative of a current operating/executional state of the application. As indicated above, depending on the particular embodiment, the computing device 102 may transmit the application context to the display unit 120 when the application is assigned, when the display unit 120 is detached from the computing device 102, and/or when the display unit 120 otherwise handles execution of the application. Further, as discussed below, when the display unit 120 is reattached to the computing device 102 or the computing device 102 otherwise resumes execution of the application, the display unit 120 may transmit the application context to the computing device 102. As such, the display unit 120 and the computing device 102 are able to maintain execution of the computing device 102 with limited breaks (e.g., temporal pauses) in the execution.

In block 512, the computing device 102 determines whether the display unit 120 has been detached. It should be appreciated that the computing device 102 may utilize any suitable techniques or mechanisms for doing so. For example, the computing device 102 may periodically ping each display unit 120, the computing device 102 may infer detachment based on signals received from the display unit 120 (or lack thereof), the display unit 120 may inform the computing device 102 of such detachment, etc. If the computing device 102 determines that the display unit 120 has been detached, the computing device 102 determines whether to monitor the assigned conditions (if any) on the computing device 102 in block 514. That is, the computing device 102 determines whether the conditions are to be monitored on the computing device 102 and/or on the display unit 120. If the computing device 102 determines to monitor the conditions, the computing device 102 monitors for satisfied conditions in block 514. As discussed above, in doing so, the computing device 102 may, for example, receive sensor data and/or other data from the sensor(s) 122 and/or from the display unit 120 and evaluate that data based on the policies for the application and/or the display unit 120 stored in the display policy database 314 (e.g., by comparing the received data to the display policy database 314). If, in block 512, the computing device 102 determines that the display unit 120 has not been detached, the method 500 advances to block 516 in which the computing device 102 monitors for satisfied conditions. In other words, in the illustrative embodiment, the display unit 120 only monitors conditions, if at all, when the display unit 120 is detached from the computing device 102. Of course, in other embodiments, that may not be the case.

In block 518, the computing device 102 determines whether any of the assigned conditions have been satisfied. If so, the computing device 102 performs a corresponding action for the satisfied condition in block 520. In some embodiments, the computing device 102 may transmit, in block 522, an action instruction to the display unit 120 indicating an action to be performed by the display unit 120 in response to the satisfaction of the condition (e.g., based on the display policy database 314). As discussed below, such actions may include, but are not limited to, terminating the application, modifying the application or a feature of the application, and/or pausing the application or a state or feature of the application.

It should be appreciated that, in some embodiments, the computing device 102 and/or the display unit 120 may perform an action in response to a condition being satisfied. If the computing device 102 determines not to monitor conditions in block 514, determines a condition has not been satisfied in block 518, or performs the corresponding action in block 520, the method 500 returns to block 504 in which the computing device 102 determines whether to continue to utilize the detachable display unit 120. Of course, in subsequent iterations of the method 500, the computing device 102 may or may not assign additional applications to the display unit 120 or modify the conditions assigned to the applications of the display unit 120. Additionally, in some embodiments, the computing device 102 may execute a method similar to the method 500 for each application assigned to the display unit 120.

Figure 6:
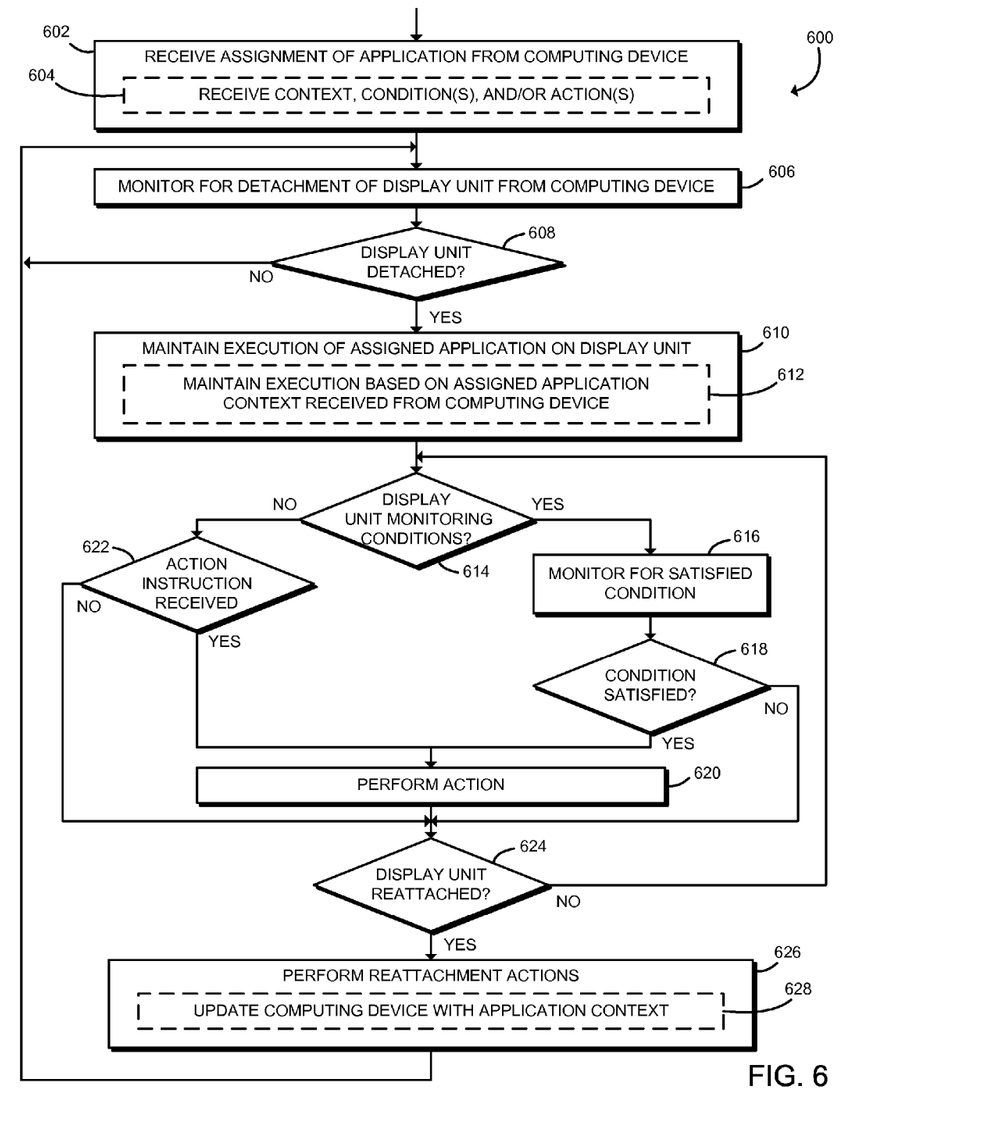
FIG. 6 is a simplified flow diagram of at least one embodiment of a method for utilizing a display unit detachable from the computing device of the system of FIG. 1.

Referring now to FIG. 6, in use, each display unit 120 of the system 100 may execute a method 500 for execution of an application. The illustrative method 600 begins with block 602 of FIG. 6 in which the display unit 120 (i.e., the display unit 120 selected to be assigned an application) receives an assignment of an application from the computing device 102. In block 604, the display unit 120 may receive context information, one or more conditions, and/or corresponding actions for the assigned application. In block 606, the display unit 120 monitors for detachment of the display unit 120 from the computing device 102. In doing so, the display unit 120 may utilize any suitable technique or mechanism. The display unit 120 determines whether the display unit 120 has been detached (i.e., physically removed) from the computing device 102 in block 608. For example, the display unit 120 may periodically ping the computing device 102, the display unit 120 may infer detachment based on signals received from the computing device 102 (or lack thereof), the computing device 102 may inform the display unit 120 of such detachment, etc. Depending on the particular structure of the display unit 120, the display unit 120 may be removed using any suitable mechanism. For example, a "peelable" display unit 120 may be peeled from the computing device 102 and reattached to another suitable surface (e.g., reattached to a wall, table, or back to the computing device 102).

If the display unit 120 determines that it has been detached from the computing device 102, the display unit 120 maintains execution of the assigned application in block 610. As discussed above, in block 612, the display unit 120 may do so based on the assigned application context received from the computing device 102. For example, based on the application context, the display unit 120 may resume execution of the application at the point execution was postponed by the computing device 102 (e.g., upon detachment of the display unit 120 from the computing device 102). In block 614, the display unit 120 determines whether the display unit 120 is to monitor conditions. As discussed above, depending on the particular embodiment, the display unit 120 or the computing device 102 may monitor the conditions assigned to the application (or both).

If the display unit 120 determines to monitor conditions, the display unit 120 monitors for satisfied conditions in block 616. As discussed above, the display unit 120 may compare sensor data received from the sensors 122 of the display unit 120 and/or other contextual data of the display unit 120 or application to policies stored in the display policy database 410 to determine whether any of the established conditions have been satisfied. If any of the conditions have been satisfied, the display unit 120 performs the corresponding action for the satisfied condition in block 620. The corresponding action may include, for example, terminating the application, pausing the application or a state or feature of the application (e.g., an audio application), modifying the application or a feature of the application, prohibiting/permitting access to other applications of the display unit 120, "returning" or "forwarding" the application to another display unit 120, and/or performing other actions related to the operation of the application. If, in block 614, the display unit 120 determines not to monitor the conditions (i.e., the computing device 102 is to monitor the conditions), the display unit 120 determines whether an action instruction has been received from the computing device 102 in block 622. As discussed above, if the computing device 102 monitors the conditions and determines that a condition has been satisfied, the computing device 102 may transmit an instruction indicating an action to be performed by the display unit 120. If an action instruction has been received, the display unit 120 performs the action in block 620.

Regardless, after performance of any action in block 620, if no instruction has been received from the computing device 102 in block 622, and/or no condition has been satisfied in block 618, the method 600 advances to block 624 in which the display unit 120 determines whether the display unit 120 has been reattached. If so, the display unit 120 performs one or more reattachment actions in block 626. For example, in block 628, the display unit 120 may update the computing device 102 with the application context as discussed above. Of course, in other embodiments, the display unit 120 may perform additional or other actions related to the reattachment of the display unit 120 to the computing device 102 (e.g., delete the relevant portions of the display policy database 410). After performance of any such reattachment actions, the method 600 returns to block 606 in which the display unit 120 monitors for detachment from the computing device 102. Alternatively, if the display unit 120 determines, in block 624, that it has not been reattached, the method 600 returns to block 614 in which the display unit 120 determines whether the display unit 120 or the computing device 102 is to monitor the conditions. It should be appreciated that, in some embodiments, the display unit 120 may not make another independent determination but instead may rely on a previous determination of which device is monitoring the conditions.

In one usage example, a user could assign an application to a display unit 120 and leave the display unit 120 on his or her desk while away. Others may interact with the display unit 120 based on, for example, usage rights established in the display policy database 410. For example, the user may leave a virtual white board that anyone can write onto, an image slide show that others are only able to watch (i.e., they are unable to modify), and/or a messaging application that only specified individuals can access (e.g., using near field communication connections of other devices, biometrics, passwords, or other authentication mechanisms). In another example, the user may assign an application (e.g., a video game) to a particular display unit 120, "peel" the display unit 120 from the computing device 102, and place it on a table top for another person (e.g., the user's child) to use. The user could also implement a usage control mechanism (i.e., a condition and corresponding action) such that the application will expire (i.e., terminate) after a certain period of time. Additionally, the detached display unit 120 may have the same role on a daily basis on may be modified based on additional conditions (e.g., grades at school, chores at home, or other conditions). It should be appreciated that the technologies and mechanisms discussed herein permit the use of multiple detachable display units 120 that may remotely execute applications based on assignment without interrupting the flow of the computing device 102 (e.g., without rebooting or relaunching an application).

Figure 7:
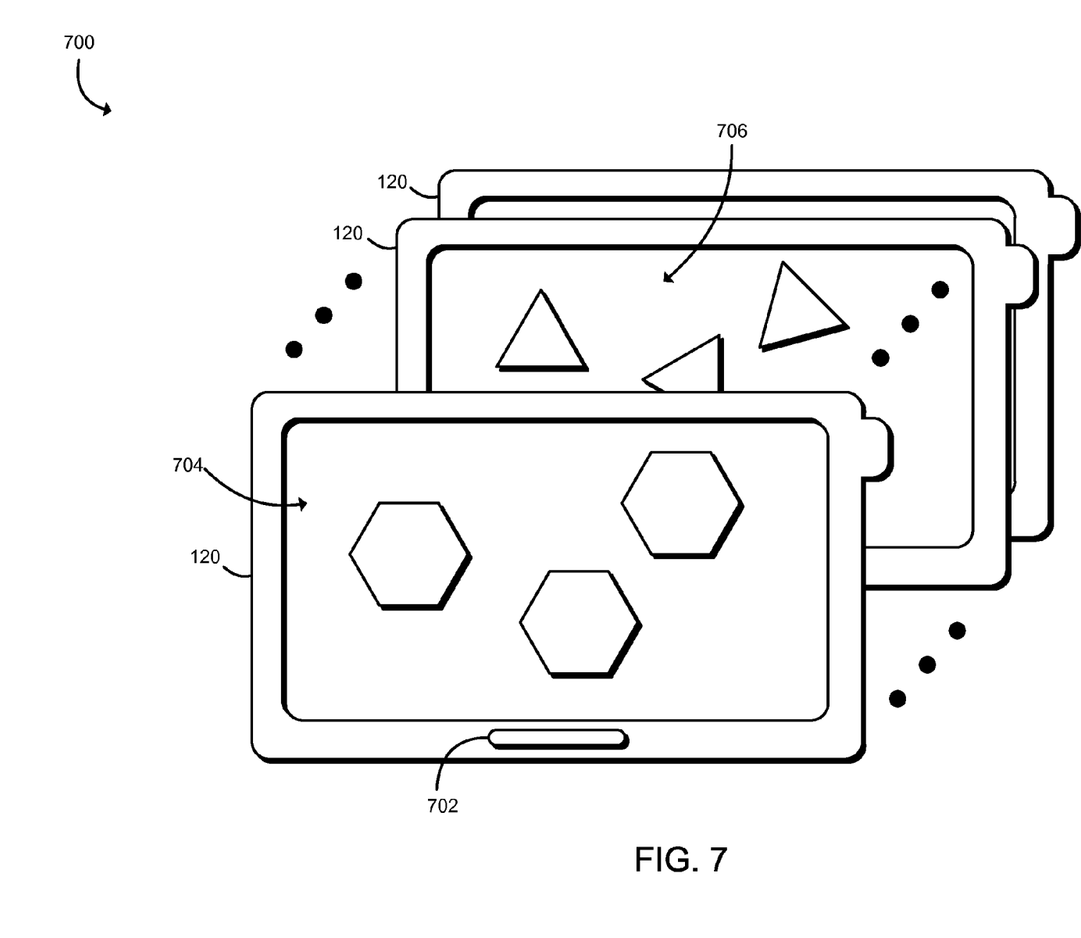
FIG. 7 is a simplified block diagram of at least one embodiment of a plurality of display units of the system of FIG. 1 in use.

Referring now to FIG. 7, a plurality 700 of display units 120 of the computing device 102 is shown. As discussed above, multiple display units 120 may be detached from the computing device 102 and used for different purposes (e.g., for executing different applications). For example, in the illustrative embodiment, one of the display units 120 is displaying (and therefore executing) a first application 704 and another of the display units 120 is displaying (and therefore executing) a second application 706 different from the first application 704. Further, in the illustrative embodiment, the non-display components 702 of the display units 120 are located at the periphery of the display units 120. However, as discussed above, the non-display components 702 may be otherwise positioned in other embodiments (e.g., integrated into the display 218 of the display unit 120). Additionally, in the illustrative embodiment, the display units 120 are removed from the computing device 102 by being "peeled" from the computing device 102 via the illustrated tabs. Of course, the display units 120 may be otherwise detached in other embodiments.

EXAMPLES

Illustrative examples of the technologies disclosed herein are provided below. An embodiment of the technologies may include any one or more, and any combination of the examples described below.

Example 1 includes a computing system for utilizing a plurality of displays, the computing device comprising a computing device comprising an application execution module and a display management module; and a plurality of detachable display units physically coupled to the computing device, each detachable display unit of the plurality of detachable display units comprising a display, an attachment status module, and an application management module, wherein the application execution module is to execute an application of the computing device, the display management module is to assign the application to a selected detachable display unit of the plurality of detachable display units, the attachment status module of the selected detachable display unit is to monitor for detachment of the selected detachable display unit from the computing device, and the application management module of the selected detachable display unit is to maintain execution of the assigned application in response to detachment of the selected detachable display unit.

Example 2 includes the subject matter of Example 1, and wherein the computing device comprises a primary processor and a primary memory; and wherein each detachable display unit comprises a local processor and a local memory.

Example 3 includes the subject matter of any of Examples 1 and 2, and wherein each local processor is a low-power processor relative to the primary processor.

Example 4 includes the subject matter of any of Examples 1-3, and wherein to assign the application to the selected detachable display unit comprises to establish a condition of the application and a corresponding action to occur in response to satisfaction of the condition.

Example 5 includes the subject matter of any of Examples 1-4, and wherein the display management module is further to monitor data of the selected detachable display unit to determine whether the condition has been satisfied in response to a determination to monitor the data by the computing device.

Example 6 includes the subject matter of any of Examples 1-5, and wherein the display management module is further to perform the corresponding action in response to a determination that the condition has been satisfied.

Example 7 includes the subject matter of any of Examples 1-6, and wherein to perform the corresponding action comprises to transmit an instruction to the selected detachable display unit that indicates an action to be performed by the selected detachable display unit.

Example 8 includes the subject matter of any of Examples 1-7, and wherein the condition of the application comprises expiration of a predefined period of time.

Example 9 includes the subject matter of any of Examples 1-8, and wherein the satisfaction of the condition is evaluated based on sensor data transmitted from one or more sensors of the selected detachable display unit to the computing device.

Example 10 includes the subject matter of any of Examples 1-9, and wherein the corresponding action comprises termination of the application.

Example 11 includes the subject matter of any of Examples 1-10, and wherein to assign the application to the selected detachable display unit comprises to assign a context of the application to the selected detachable display unit.

Example 12 includes the subject matter of any of Examples 1-11, and wherein to monitor for detachment of the selected detachable display unit from the computing device comprises to determine whether the selected detachable display unit is physically coupled to the computing device.

Example 13 includes a method for utilizing a plurality of displays with a computing device, the method comprising executing, by the computing device, an application of the computing device; assigning, by the computing device, the application to a selected detachable display unit of a plurality of detachable display units physically coupled to the computing device; monitoring, by the detachable display unit, for detachment of the detachable display unit from the computing device; and maintaining, by the detachable display unit, execution of the assigned application in response to detachment of the detachable display unit.

Example 14 includes the subject matter of Example 13, and wherein assigning the application to the detachable display unit comprises establishing a condition of the application and a corresponding action to occur in response to satisfaction of the condition.

Example 15 includes the subject matter of any of Examples 13 and 14, and further including monitoring, by the computing device, data of the detachable display unit to determine whether the condition has been satisfied in response to determining to monitor the data by the computing device.

Example 16 includes the subject matter of any of Examples 13-15, and further including performing, by the computing device, the corresponding action in response to determining the condition has been satisfied.

Example 17 includes the subject matter of any of Examples 13-16, and wherein performing the corresponding action comprises transmitting an instruction to the detachable display unit indicating an action to be performed by the detachable display unit.

Example 18 includes the subject matter of any of Examples 13-17, and wherein the condition of the application comprises expiration of a predefined period of time.

Example 19 includes the subject matter of any of Examples 13-18, and wherein the satisfaction of the condition is evaluated based on sensor data transmitted from one or more sensors of the detachable display unit to the computing device.

Example 20 includes the subject matter of any of Examples 13-19, and wherein the corresponding action comprises terminating the application.

Example 21 includes the subject matter of any of Examples 13-20, and wherein assigning the application to the detachable display unit comprises assigning a context of the application to the detachable display unit.

Example 22 includes the subject matter of any of Examples 13-21, and wherein monitoring for detachment of the detachable display unit from the computing device comprises determining whether the detachable display unit is physically coupled to the computing device.

Example 23 includes a computing device comprising a processor; and a memory having stored therein a plurality of instructions that, when executed by the processor, cause the computing device to perform the method of any of Examples 13-22.

Example 24 includes one or more machine-readable storage media comprising a plurality of instructions stored thereon that, in response to being executed, result in a computing device performing the method of any of Examples 13-22.

Example 25 includes a computing system for utilizing a plurality of displays with a computing device, the computing system comprising means for executing an application of the computing device; means for assigning the application to a detachable display unit of a plurality of detachable display units physically coupled to the computing device; means for monitoring for detachment of the detachable display unit from the computing device; and means for maintaining execution of the assigned application in response to detachment of the detachable display unit.

Example 26 includes the subject matter of Example 25, and wherein the means for assigning the application to the detachable display unit comprises means for establishing a condition of the application and a corresponding action to occur in response to satisfaction of the condition.

Example 27 includes the subject matter of any of Examples 25 and 26, and further including means for monitoring data of the detachable display unit to determine whether the condition has been satisfied in response to determining to monitor the data by the computing device.

Example 28 includes the subject matter of any of Examples 25-27, and further including means for performing the corresponding action in response to determining the condition has been satisfied.

Example 29 includes the subject matter of any of Examples 25-28, and wherein the means for performing the corresponding action comprises means for transmitting an instruction to the detachable display unit indicating an action to be performed by the detachable display unit.

Example 30 includes the subject matter of any of Examples 25-29, and wherein the condition of the application comprises expiration of a predefined period of time.

Example 31 includes the subject matter of any of Examples 25-30, and further including means for evaluating satisfaction of the condition based on sensor data transmitted from one or more sensors of the detachable display unit to the computing device.

Example 32 includes the subject matter of any of Examples 25-31, and wherein the corresponding action comprises termination of the application.

Example 33 includes the subject matter of any of Examples 25-32, and wherein the means for assigning the application to the detachable display unit comprises means for assigning a context of the application to the detachable display unit.

Example 34 includes the subject matter of any of Examples 25-33, and wherein the means for monitoring for detachment of the detachable display unit from the computing device comprises means for determining whether the detachable display unit is physically coupled to the computing device.

Example 35 includes a detachable display unit for execution of an application, the display unit comprising an application management module to receive, from a computing device, an assignment of the application to the detachable display unit in response to a selection, by the computing device, of the detachable display unit for execution of the application from a plurality of detachable display units physically coupled to the computing device; and an attachment status module to monitor for detachment of the detachable display unit from the computing device, wherein the application management module is further to maintain execution of the assigned application in response to detachment of the detachable display unit from the computing device.

Example 36 includes the subject matter of Example 35, and wherein to receive the assignment of the application comprises to receive a context of the application from the computing device.

Example 37 includes the subject matter of any of Examples 35 and 36, and wherein to maintain the execution of the assigned application comprises to execution the application based on the context of the application.

Example 38 includes the subject matter of any of Examples 35-37, and wherein to receive the assignment comprises to receive a condition of the application and a corresponding action to occur in response to satisfaction of the condition.

Example 39 includes the subject matter of any of Examples 35-38, and wherein the application management module is further to monitor sensor data generated by one or more sensors of the detachable display unit to determine whether the condition has been satisfied in response to a determination to monitor the sensor data by the detachable display unit.

Example 40 includes the subject matter of any of Examples 35-39, and wherein the application management module is further to perform the corresponding action in response to a determination that the condition has been satisfied.

Example 41 includes the subject matter of any of Examples 35-40, and wherein the condition of the application comprises expiration of a predefined period of time.

Example 42 includes the subject matter of any of Examples 35-41, and wherein the corresponding action comprises termination of the application.

Example 43 includes the subject matter of any of Examples 35-42, and wherein to monitor for detachment of the detachable display unit from the computing device comprises to determine whether the detachable display unit is physically coupled to the computing device.

Example 44 includes the subject matter of any of Examples 35-43, and wherein the application management module is further to (i) receive, from the computing device in response to a determination by the computing device that a condition of the application has been satisfied, an instruction that indicates an action to be performed by the detachable display unit in response to a determination to monitor the sensor data by the computing device and (ii) perform the action.

Example 45 includes the subject matter of any of Examples 35-44, and wherein the application management module is to perform a reattachment action in response to a determination that the detachable display unit has been reattached to the computing device.

Example 46 includes the subject matter of any of Examples 35-45, and wherein to perform the reattachment action comprises to update the computing device with a context of the application.

Example 47 includes the subject matter of any of Examples 35-46, and further including a processor, a memory, and a display.

Example 48 includes a method for utilizing a display unit detachable from a computing device, the method comprising receiving, by a detachable display unit of a plurality of detachable display units physically coupled to the computing device, an assignment of an application executed by the computing device; monitoring, by the detachable display unit, for detachment of the detachable display unit from the computing device; and maintaining, by the detachable display unit, execution of the assigned application in response to detachment of the detachable display unit from the computing device.

Example 49 includes the subject matter of Example 48, and wherein receiving the assignment of the application comprises receiving a context of the application from the computing device.

Example 50 includes the subject matter of any of Examples 48 and 49, and wherein maintaining the execution of the assigned application comprises executing the application based on the context of the application.

Example 51 includes the subject matter of any of Examples 48-50, and wherein receiving the assignment comprises receiving a condition of the application and a corresponding action to occur in response to satisfaction of the condition.

Example 52 includes the subject matter of any of Examples 48-51, and further including monitoring, by the detachable display unit, sensor data generated by one or more sensors of the detachable display unit to determine whether the condition has been satisfied in response to determining to monitor the sensor data by the detachable display unit.

Example 53 includes the subject matter of any of Examples 48-52, and further including performing, by the detachable display unit, the corresponding action in response to determining the condition has been satisfied.

Example 54 includes the subject matter of any of Examples 48-53, and wherein the condition of the application comprises expiration of a predefined period of time.

Example 55 includes the subject matter of any of Examples 48-54, and wherein the corresponding action comprises terminating the application.

Example 56 includes the subject matter of any of Examples 48-55, and wherein monitoring for detachment of the detachable display unit from the computing device comprises determining whether the detachable display unit is physically coupled to the computing device.

Example 57 includes the subject matter of any of Examples 48-56, and further including receiving, by the detachable display unit and from the computing device in response to a determination by the computing device that a condition of the application has been satisfied, an instruction that indicates an action to be performed by the detachable display unit in response to determining to monitor the sensor data by the computing device; and performing, by the detachable display unit, the action.

Example 58 includes the subject matter of any of Examples 48-57, and further including performing, by the detachable display unit, a reattachment action in response to determining the detachable display unit has been reattached to the computing device.

Example 59 includes the subject matter of any of Examples 48-58, and wherein performing the reattachment action comprises updating the computing device with a context of the application.

Example 60 includes a computing device comprising a processor; and a memory having stored therein a plurality of instructions that, when executed by the processor, cause the computing device to perform the method of any of Examples 48-59.

Example 61 includes one or more machine-readable storage media comprising a plurality of instructions stored thereon that, in response to being executed, result in a computing device performing the method of any of Examples 48-59.

Example 62 includes a detachable display unit for execution of an application, the detachable display unit comprising means for receiving an assignment of an application executed by the computing device, the detachable display unit being selected from a plurality of detachable display units physically coupled to the computing device; means for monitoring for detachment of the detachable display unit from the computing device; and means for maintaining execution of the assigned application in response to detachment of the detachable display unit from the computing device.

Example 63 includes the subject matter of Example 62, and wherein the means for receiving the assignment of the application comprises means for receiving a context of the application from the computing device.

Example 64 includes the subject matter of any of Examples 62 and 63, and wherein the means for maintaining the execution of the assigned application comprises means for executing the application based on the context of the application.

Example 65 includes the subject matter of any of Examples 62-64, and wherein the means for receiving the assignment comprises means for receiving a condition of the application and a corresponding action to occur in response to satisfaction of the condition.

Example 66 includes the subject matter of any of Examples 62-65, and further including means for monitoring sensor data generated by one or more sensors of the detachable display unit to determine whether the condition has been satisfied in response to determining to monitor the sensor data by the detachable display unit.

Example 67 includes the subject matter of any of Examples 62-66, and further including means for performing the corresponding action in response to determining the condition has been satisfied.

Example 68 includes the subject matter of any of Examples 62-67, and wherein the condition of the application comprises expiration of a predefined period of time.

Example 69 includes the subject matter of any of Examples 62-68, and wherein the corresponding action comprises termination of the application.

Example 70 includes the subject matter of any of Examples 62-69, and wherein the means for monitoring for detachment of the detachable display unit from the computing device comprises means for determining whether the detachable display unit is physically coupled to the computing device.

Example 71 includes the subject matter of any of Examples 62-70, and further including means for receiving, from the computing device in response to a determination by the computing device that a condition of the application has been satisfied, an instruction that indicates an action to be performed by the detachable display unit in response to determining to monitor the sensor data by the computing device; and means for performing the action.

Example 72 includes the subject matter of any of Examples 62-71, and further including means for performing a reattachment action in response to determining the detachable display unit has been reattached to the computing device.

Example 73 includes the subject matter of any of Examples 62-72, and wherein the means for performing the reattachment action comprises means for updating the computing device with a context of the application.

The invention claimed is:

1. A computing system for utilizing a plurality of displays, the computing system comprising:
    a computing device comprising an application execution module and a display management module; and
    a plurality of detachable display units physically coupled to the computing device, each detachable display unit of the plurality of detachable display units comprising a display, an attachment status module, and an application management module, wherein:
    the application execution module is to execute an application of the computing device,
    the display management module is to assign the application to a selected detachable display unit of the plurality of detachable display units,
    the attachment status module of the selected detachable display unit is to monitor for detachment of the selected detachable display unit from the computing device, and
    the application management module of the selected detachable display unit is to maintain continuous execution of the assigned application initially executed by the computing device and subsequently executed by the selected detachable display unit in response to detachment of the selected detachable display unit.

2. The computing system of claim 1, wherein the computing device comprises a primary processor and a primary memory; and
    wherein each detachable display unit comprises a local processor and a local memory.

3. The computing system of claim 2, wherein each local processor is a low-power processor relative to the primary processor.

4. The computing system of claim 1, wherein to assign the application to the selected detachable display unit comprises to establish a condition of the application and a corresponding action to occur in response to satisfaction of the condition.

5. The computing system of claim 4, wherein the display management module is further to (i) monitor data of the selected detachable display unit to determine whether the condition has been satisfied in response to a determination to monitor the data by the computing device and (ii) perform the corresponding action in response to a determination that the condition has been satisfied.

6. The computing system of claim 5, wherein to perform the corresponding action comprises to transmit an instruction to the selected detachable display unit that indicates an action to be performed by the selected detachable display unit.

7. The computing system of claim 4, wherein:
    the condition of the application comprises expiration of a predefined period of time; and
    the corresponding action comprises termination of the application.

8. The computing system of claim 4, wherein the satisfaction of the condition is evaluated based on sensor data transmitted from one or more sensors of the selected detachable display unit to the computing device.

9. The computing system of claim 1, wherein to assign the application to the selected detachable display unit comprises to assign a context of the application to the selected detachable display unit.

10. The computing system of claim 1, wherein to monitor for detachment of the selected detachable display unit from the computing device comprises to determine whether the selected detachable display unit is physically coupled to the computing device.

11. A detachable display unit for execution of an application, the display unit comprising:
    an application management module to receive, from a computing device, an assignment of the application to the detachable display unit in response to a selection, by the computing device, of the detachable display unit for execution of the application from a plurality of detachable display units physically coupled to the computing device; and
    an attachment status module to monitor for detachment of the detachable display unit from the computing device,
    wherein the application management module is further to maintain continuous execution of the assigned application initially executed by the computing device and subsequently executed by the selected detachable display unit in response to detachment of the detachable display unit from the computing device.

12. The detachable display unit of claim 11, wherein to:
    receive the assignment of the application comprises to receive a context of the application from the computing device; and
    maintain the execution of the assigned application comprises to execute the application based on the context of the application.

13. The detachable display unit of claim 11, wherein to receive the assignment comprises to receive a condition of the application and a corresponding action to occur in response to satisfaction of the condition.

14. The detachable display unit of claim 13, wherein the application management module is further to (i) monitor sensor data generated by one or more sensors of the detachable display unit to determine whether the condition has been satisfied in response to a determination to monitor the sensor data by the detachable display unit and (ii) perform the corresponding action in response to a determination that the condition has been satisfied.

15. The detachable display unit of claim 11, wherein to monitor for detachment of the detachable display unit from the computing device comprises to determine whether the detachable display unit is physically coupled to the computing device.

16. The detachable display unit of claim 11, wherein the application management module is further to (i) receive, from the computing device in response to a determination by the computing device that a condition of the application has been satisfied, an instruction that indicates an action to be performed by the detachable display unit in response to a determination to monitor the sensor data by the computing device and (ii) perform the action.

17. The detachable display unit of claim 11, wherein the application management module is to perform a reattachment action in response to a determination that the detachable display unit has been reattached to the computing device.

18. The detachable display unit of claim 17, wherein to perform the reattachment action comprises to update the computing device with a context of the application.

19. The detachable display unit of claim 11, further comprising a processor, a memory, and a display.

20. One or more non-transitory machine-readable storage media comprising a plurality of instructions stored thereon that, in response to execution by a detachable display unit of a plurality of detachable display units physically coupled to a computing device, causes the detachable display unit to:
   receive an assignment of an application executed by the computing device;
   monitor for detachment of the detachable display unit from the computing device; and
   maintain continuous execution of the assigned application initially executed by the computing device and subsequently executed by the detachable display unit in response to detachment of the detachable display unit from the computing device.

21. The one or more non-transitory machine-readable storage media of claim 20, wherein to:
   receive the assignment of the application comprises to receive a context of the application from the computing device; and
   maintain the execution of the assigned application comprises to execute the application in a virtual machine that is migrated from the computing device to the display unit when the detachable display unit is detached.

* * * * *